Nov. 15, 1927.

A. G. HAWKES 1,649,404

COMBINED BUMPER AND SPARE WHEEL AND TIRE CARRIER

Filed Feb. 7, 1927

INVENTOR
Arthur G. Hawkes
BY J. H. Gibbs
ATTORNEY

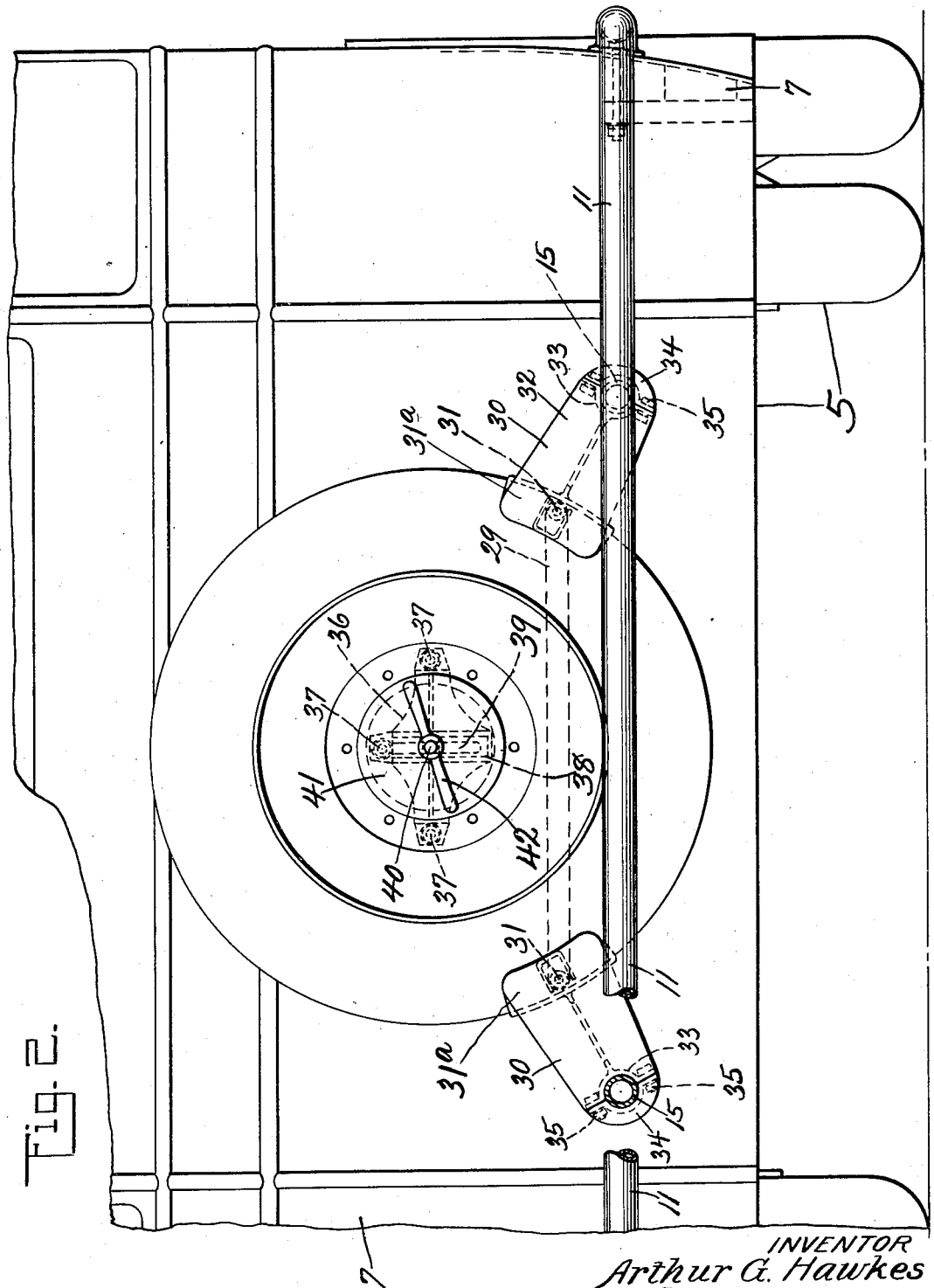

Nov. 15, 1927.
A. G. HAWKES
1,649,404
COMBINED BUMPER AND SPARE WHEEL AND TIRE CARRIER
Filed Feb. 7, 1927
3 Sheets-Sheet 3
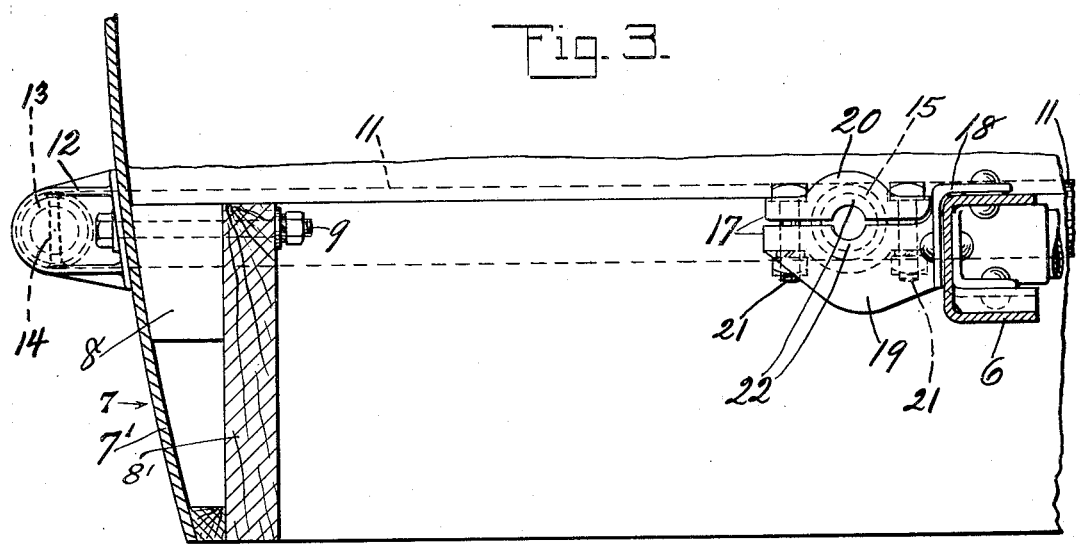
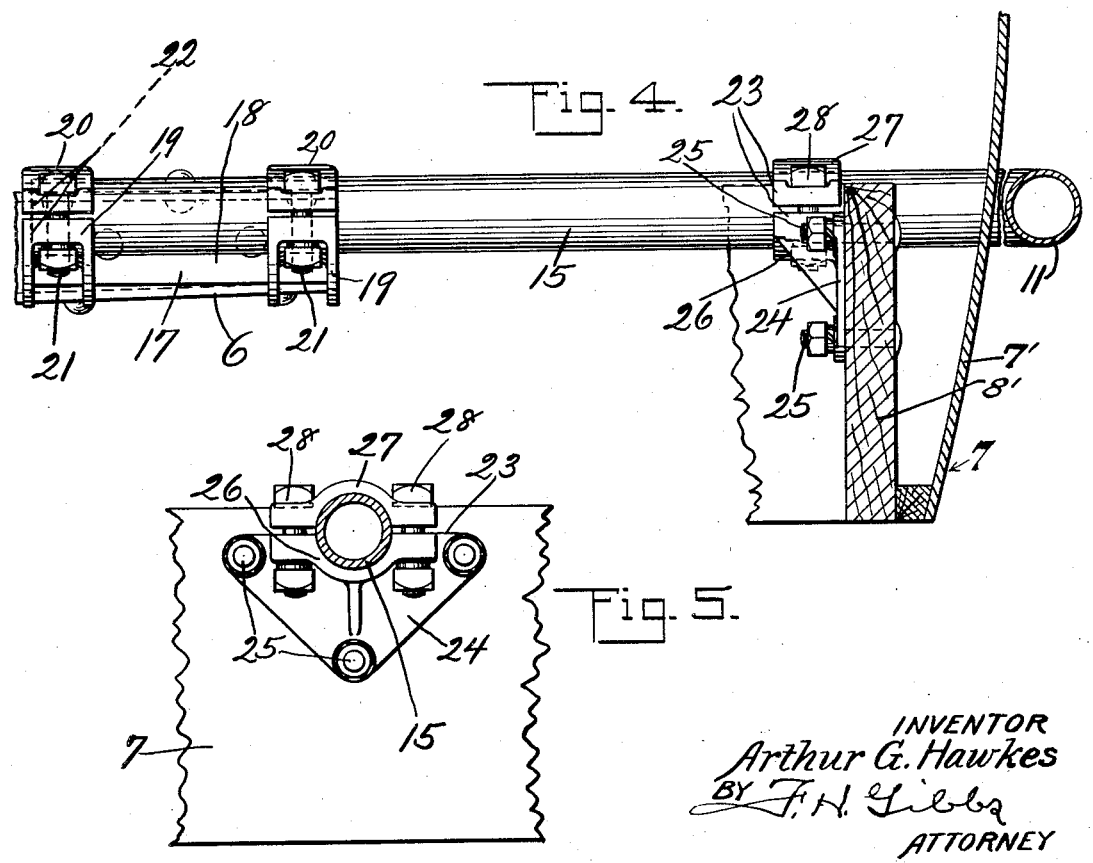
INVENTOR
Arthur G. Hawkes
BY F. H. Gibbs
ATTORNEY Patented Nov. 15, 1927.

1,649,404

UNITED STATES PATENT OFFICE.

ARTHUR G. HAWKES, OF DETROIT, MICHIGAN, ASSIGNOR TO AMERICAN CAR AND FOUNDRY MOTORS COMPANY, OF NEW YORK, N. Y., A CORPORATION OF DELAWARE.

COMBINED BUMPER AND SPARE WHEEL AND TIRE CARRIER.

Application filed February 7, 1927. Serial No. 166,490.

In the drawings:

Fig. 2 is a fragmentary rear elevation having parts broken away;

Fig. 3 is a fragmentary sectional view taken on line 3—3 of Fig. 1;

Fig. 4 is a fragmentary longitudinal sectional view on line 4—4 of Fig. 1;

Fig. 5 is a sectional view on line 5—5 of Fig. 1.

Figure 1:
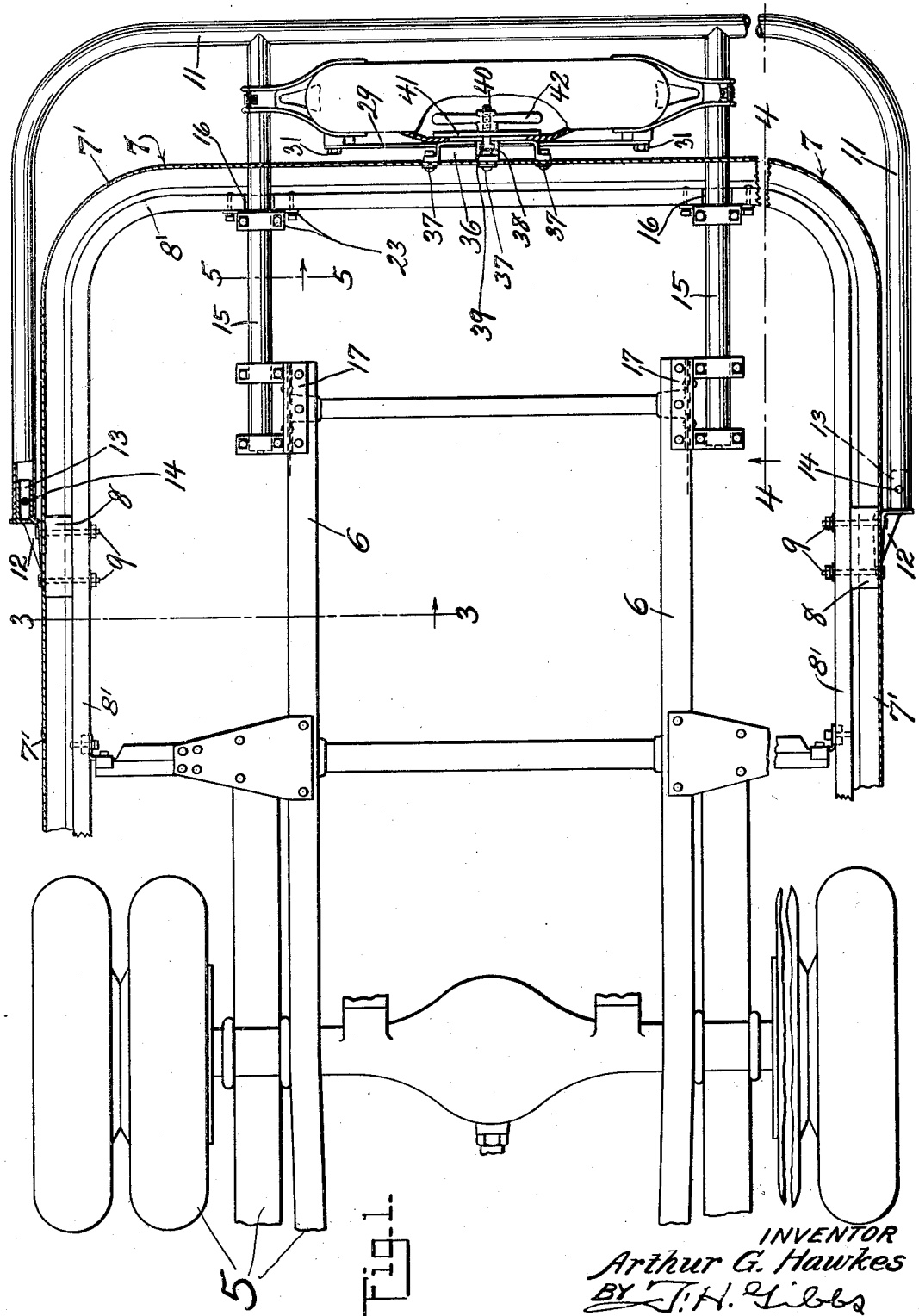
Fig. 1 is a plan view, partly in section, of an automotive bus having my improved rear bumper and spare wheel and tire carrier associated therewith.

My invention relates to automotive buses, and more particularly to a combined bumper and spare wheel and tire carrier. This invention provides a strong and durable bumper which will stand the maximum of strain and rough usage as a bumper, and at the same time constitute a spare wheel and tire carrier. Further, the invention provides a bumper for the rear end of an automotive bus, which extends completely around the bus and partly around the sides thereof, thus affording a maximum protection to the latter, and which is so constructed as to permit the rear end of the bus to be lifted from the roadway in the event of accident by engaging a jack or other hoisting apparatus with the bumper.

Referring to the invention in detail, a conventional motor vehicle or bus is designated at 5, and includes the usual parallel side sills 6 of the chassis or frame, and a body indicated generally at 7, the latter comprising the sheathing 7' and the body frame 8'. For the purpose of reinforcing the body 7 at points where the extremities of my improved bumper are supported, spacing blocks 8 are arranged in transverse alinement between the body frame 8' and sheathing 7', and are held in place by bolts 9 passing transversely through the spacing blocks, sheathing and body frame.

As shown in Fig. 1, the bumper 11 is formed from a length of tubing bent to U-shape formation with its intermediate leg spaced from and extending around the rear end of the body, and its parallel legs extended parallel to the sides of the body. In order to mount the extremities of the U-shape bumper 11, angle brackets 12 are bolted to the body 7 and formed with supporting sleeves 13, which extend parallelly to the bumper in alinement with the ends thereof to engage within these ends, as shown. Retaining pins or fastenings 14 pass transversely through the extremities of the bumper and sleeves 13. In connection with the brackets 12, it will be observed that they are anchored by means of the same bolts that hold the spacing blocks 8. In addition to supporting the bumper 11 from the extremities, I also contemplate supporting the intermediate leg from the chassis sills 6 and body frame 8'. For this purpose parallel horizontal legs 15 carried by the intermediate leg pass through openings 16, slightly offset from the ends of the sills 6, and have their inner ends disposed parallel to and in close relation to the sills 6. Clamps 17 are attached to the sills to receive and support these legs 15. These clamps 17 comprise angle plates 18, with each of which a pair of longitudinally extended fixed clamp jaws 19 are cast. Removable clamp jaws or straps 20 are provided for each of these clamp jaws 19, said jaws being brought into clamped engagement with the legs 15 by bolts 21 engaged with the jaws as shown in Fig. 3. As illustrated in Fig. 3, the forward jaws 19 and 20 of each clamp are formed with inwardly directed stop flanges 22, against which the ends of the legs 15 abut, and thereby brace the latter against end thrust when the bumper has been collided with or strikes an obstruction. To further secure the legs 15 and lend rigidity to the same, clamps 23 are provided. These clamps 23 embody attaching plates 24 bolted or otherwise secured to the vehicle by fastenings 25. A laterally disposed clamping jaw 26 is formed with each of these attaching plates, and is adapted to embrace the underface of the legs. Removable clamps or straps 27 are provided for co-operation with the jaws 26 in clamping the legs 15, and are held in co-operative relation by bolts 28. It will be seen that the ends and intermediate leg of the bumper are rigidly anchored, and that as the maximum strain is imparted to the intermediate leg such strain will be imparted to and absorbed by the chassis sills 6 and not the body walls 7. This arrangement also makes it convenient for lifting the vehicle on to the roadway, or elevating it as when towing, by engaging the intermediate leg of the bumper with a suitable hoist.

The invention contemplates employing the bumper as a spare wheel and tire carrier, and to that end I provide the horizontal cross or tie bar 29, which carries the tire rests 30 at its ends, the latter being arranged in divergent relation and attached to the cross or tie bar by fastenings 31. Each of these tire rests consists of a channel shaped or semi-circular casting 31ª, which embrace the tire at opposite sides of its base as shown in Fig. 2. A tapered channel shaped bracket 32 is cast with the underface of each of the channel shaped members 31ª, and is formed with a clamp 33 at its inner end engaging one of the legs 15. Removable clamps 34 embrace these legs, and are held to the clamps 33 by movable fastenings 35.

For co-operation with the seats 30 in retaining the spare wheel and tire in place, a spider or casting 36 is attached to the rear end wall at a central point thereon with respect to the tire seats 30 by means of fastenings 37. A vertically disposed guide 38 is cast with the spider 36, and has a T-shaped vertically disposed groove 39 therein receiving the head of a T bolt 40, the latter projecting laterally through the groove, and passes through a clamping disk or plate 41 which is arranged to engage the web or body of a disk wheel, as illustrated in Fig. 1. A wing nut 42 is received on the T bolt 40 for holding the disk or clamping plate 41 in clamped engagement with the disk wheel. This grooved guide or casting 38 and its co-operating T bolt permit wheels of various diameters to be carried. In this connection, the T bolt is moved longitudinally the required distance for passing through the usual hub receiving opening of the wheel. The invention also permits the vehicle body with the bumper associated therewith to be lifted from the chassis should it be necessary to do so.

What is claimed is:

1. An automobile bumper construction comprising a bumper element formed of a single piece of material and comprising spaced parallel portions secured to the vehicle body, and an intermediate portion having integral inwardly extending attaching portions passing through the body, said attaching portions being clampingly secured to the body and arranged parallel to said spaced parallel portions.

2. In combination with a motor vehicle having a chassis frame, a body frame and a sheathing spaced from said body frame by blocks, a bumper construction comprising a bumper element having spaced parallel portions adjacent the sides of said vehicle, means securing said spaced parallel portions to the body frame, an intermediate portion adjacent the end of the vehicle, spaced parallel attaching portions integral with said intermediate portion and extending inwardly through said body frame and sheathing adjacent the chassis frame, means engaging the ends of the attaching portions for securing the latter to the chassis frame, and means intermediate the ends of the attaching portions for securing the latter to the body frame.

3. In combination with a motor vehicle having a chassis frame, a body frame and a sheathing spaced from said body frame by blocks, a bumper construction comprising a bumper element having spaced parallel portions adjacent the side of said vehicle, means securing said spaced parallel portions to the body frame, an intermediate portion adjacent the end of the vehicle, spaced parallel attaching portions integral with said intermediate portion and extending inwardly through said body frame and sheathing adjacent the chassis frame, means engaging the ends of the attaching portions for securing the latter to the chassis frame, means intermediate the ends of the attaching portions for securing the latter to the body frame, tire carrying elements secured to the attaching portions, and means connecting said tire carrying elements.

4. In an automobile bumper, a unitary structure comprising a non-yieldable bumper element having an intermediate portion adapted to lie adjacent the end of an automobile, spaced parallel end portions formed integral with said intermediate portion and adapted to be positioned adjacent the sides of the automobile, and attaching portions formed with the intermediate portion and passing through the body and attached to the automobile chassis frame.

5. In combination with a motor vehicle having a chassis frame, a body frame and a sheathing spaced from said body frame by blocks, a bumper construction comprising a U-shaped bumper element having spaced parallel attaching ends adjacent the sides of the vehicle, means secured to the spacing blocks for mounting the ends of said bumper element, inwardly extending attaching elements formed with said U-shaped element, and means secured to the chassis frame for engaging the ends of said attaching elements for supporting the latter.

6. A motor vehicle bumper construction comprising a U-shaped element, means at the ends of the element for attaching the latter to a vehicle body, attaching elements extending inwardly from the element, means secured to the vehicle body for supporting the element, and clamp means secured to the chassis frame for engaging the ends of the attaching elements to support the U-shaped element.

7. In combination with a motor vehicle having a chassis frame and a body, a combined bumper and tire support comprising a U-shaped element, means secured to the body and engaging the ends of the U-shaped element for attaching the latter to the body, inwardly extending attaching legs secured to the U-shaped element, clamp means secured to the chassis frame for supporting the U-shaped element, means on said clamping means for taking up end thrust of said attaching legs, means secured to the body for supporting the legs, a tire rest secured to each attaching leg, and means connecting said tire rests.

8. In a motor vehicle bumper construction, a unitary non-yieldable structure comprising a bumper element having integral spaced parallel ends secured to the vehicle body and an intermediate portion adjacent the end of the vehicle, and spaced attaching elements formed with the intermediate portion and passing through the body and secured to the vehicle chassis frame.

9. A motor vehicle bumper construction, including a bumper element formed of a single piece of material and comprising spaced parallel end portions secured to the vehicle body, and an intermediate portion having integral inwardly extending attaching portions parallel to said end portions extending through the body and secured to the vehicle chassis frame.

10. In a motor vehicle bumper construction, a non-yielding unitary structure comprising a bumper element having integral spaced parallel ends secured to the vehicle body and an intermediate portion, spaced attaching elements extending from the intermediate portion and passing through the vehicle body, and means secured to the chassis frame for mounting the ends of said attaching elements and for taking up end thrust thereof.

In witness whereof I have hereunto set my hand.

ARTHUR G. HAWKES.